United States Patent [19]

Carney

[11] 3,948,803

[45] Apr. 6, 1976

[54] CATALYST

[75] Inventor: Robert L. Carney, Palo Alto, Calif.

[73] Assignee: Zoecon Corporation, Palo Alto, Calif.

[22] Filed: May 28, 1974

[21] Appl. No.: 473,628

[52] U.S. Cl.......... 252/429 R; 252/438; 260/290 R; 260/293.51; 260/302 R; 260/307 R; 260/329 R; 260/666 R; 260/671 C
[51] Int. Cl.²........................................... B01J 27/26
[58] Field of Search........................ 252/438, 429 R

[56] References Cited
UNITED STATES PATENTS

| | | | |
|---|---|---|---|
| 2,626,963 | 1/1953 | Clark | 252/438 X |
| 3,009,969 | 11/1961 | Spencer et al. | 252/438 X |

OTHER PUBLICATIONS

Rose et al., The Condensed Chemical Dictionary, Reinhold Pub. Corp., N.Y., N.Y., Fifth Edition, (1956), p. 1078.

*Primary Examiner*—Patrick P. Garvin
*Attorney, Agent, or Firm*—Donald W. Erickson

[57] ABSTRACT

Catalyst compositions comprising a compound of the formula $MX(CuCN)_n$, wherein M is lithium or magnesium, X is chloro, bromo, or iodo and n is one, two or three, in solution in a solvent selected from e.g. tetrahydrofuran, tetrahydropyran and diethyl ether are useful in reactions for the alkylation of a Grignard reagent by an organic halide or an organic sulfonate ester.

3 Claims, No Drawings

3,948,803

CATALYST

FIELD OF THE INVENTION

This invention relates to a new organometallic catalyst useful for the alkylation of a Grignard reagent by an organic halide or an organic sulfonate ester. It also relates to a method for preparing this new catalyst. This invention further relates to improved processes employing said catalyst.

DESCRIPTION OF THE PRIOR ART

It is well-known that a broadly applicable procedure is needed for synthesis of carbon-carbon $\sigma$ bonds by coupling the organic moiety of an organometallic reagent with that of an organic halide or an organic sulfonate ester. Unfortunately commonly encountered organometallic derivatives of the main group metals are unsatisfactory as reagents for effecting the formation of carbon-carbon bonds by nucleophilic displacement at a carbon-halogen bond. Although organolithium reagents are strongly basic, they appear to be only weakly nucleophilic toward carbon: reaction of an organolithium compound with an alkyl or aryl halide in hydrocarbon or ether solutions usually leads to mixtures of products derived from competing metal-halogen exchange, $\alpha$ metalation, $\beta$ elimination, and coupling, with the last reaction apparently proceeding, at least in part, through a complex free-radical mechanism. Organomagnesium reagents are relatively unreactive toward simple alkyl and aryl halides; their reaction with activated halides again leads to mixtures of products. Organozinc and organoaluminum compounds exhibit low reactivity toward, e.g., n-alkyl halides. At present, the structural factors responsible for low necleophilicity of these organometallic reagents toward carbon are not entirely evident.

Organocopper (I) compounds which may be prepared by reaction of organolithium or organomagnesium compounds with copper salts, have been shown to be extremely active nucleophiles in reactions with organic halides and with $\alpha,\beta$-unsaturated carbonyl compounds. See G. M. Whitesides et al, J. Amer. Chem. Soc. 91, 4871 (1969) and H. O. House, et al, J. Org. Chem. 31, 3128 (1966). Catalytic quantities of copper salts added to Grignard reagents permit rapid carbon-carbon bond formation in reactions with organic halides under mild conditions. Unfortunately, organocopper (I) compounds are not thermally stable; they typically decompose within a few minutes at temperatures above 0°C to give zero-valent copper. This decomposition process is rapid and self-catalyzing. Moreover, zero-valent copper is a powerful catalyst for reduction of alkyl halides by Grignard reagents in an undesirable side-reaction that does not result in carbon-carbon bond formation. M. Tamura et al, *J. Organometallic Chem.* 42, 205 (1972). SInce the catalyzed reaction of a Grignard reagent with an organic halide is strongly exothermic, heat must be removed from the reaction medium by efficient external cooling in order to avoid an increase in temperature which would result in decomposition of the catalyst. In a manufacturing process, rapid removal of heat from a solution at low temperature is difficult and expensive to accomplish.

Copper (I) halides and copper (I) cyanide are of limited usefulness as catalysts in manufacturing processes because of their insolubility in the ether solvents ordinarily used for reactions of Grignard reagents. These salts dissolve slowly be reaction with Grignard reagents, but dissolution may be incomplete at low reaction temperatures, resulting in inefficient catalysis. In addition, there may be local decomposition of the organocopper intermediates on the surface of the salt particles to give zero-valent copper, which induces rapid decomposition of the organocopper intermediates throughout the solution.

Solubilized copper (I) halides such as lithium dichlorocuprate (I) react immediately with Grignard reagents to give catalytically active organocopper compounds, but these reaction mixtures are quite unstable, typically decomposing within a few minutes at temperatures above 0°.

House and Fischer, J. Org. Chem. 33, 949 (1968) report the use of aliphatic phosphines as ligands for a methyl copper and lithium halide, magnesium bromide or lithium cyanide composition for catalysing 1,4- addition reactions of $\alpha,\beta$-unsaturated ketones. While this composition has relatively good thermal stability, it has other disadvantages that make it undesirable for use in large-scale processes. Specifically, the composition is expensive, leading to an increased cost of the final product. Also, the composition has a relatively high vapor pressure, thus subjecting the workers carrying out the process to the danger of phosphine poisoning. This composition is difficult to remove from the reaction medium leading to increased costs for obtaining a pure product. Furthermore, the disagreeable odor of the phosphine makes the use of this composition unpleasant for the plant workers and undesirable from the standpoint of the potential pollution of the air around the plant.

It is an object of this invention to provide a catalyst composition that is soluble in the reaction medium for the alkylation of a Grignard reagent by an organic halide or an organic sulfonate ester.

It is a further object of this invention to provide a catalyst composition having little or no vapor phase toxicity and no objectionable odor.

It is yet another object of this invention to provide a catalyst composition having good thermal stability throughout the reaction process.

Still another object of this invention is to provide an improved process for the formation of carbon-carbon $\sigma$ bonds.

SUMMARY OF THE INVENTION

The novel catalyst composition of this invention comprises a solution of a compound of the stoichiometric formula $Mx(CuCN)_n$ wherein M is lithium or magnesium, X is chloro, bromo, or iodo and n is one, two, or three, in a solvent such as tetrahydrofuran, tethydropyran or diethyl ether.

This novel catalyst is prepared by adding cuprous cyanide and MX, wherein M and X are defined above, to an amount of solvent sufficient to maintain the MXCuCN catalyst in solution. Alternatively, the catalyst can be prepared by adding a cuprous halide (chloride, iodide, or bromide) to MCN in a solvent such as tetrahydrofuran, tetrahydropyran, or diethyl ether.

The novel catalyst composition of this invention is especially useful for catalysing reactions that involved the alkylation of a Grignard reagent.

DETAILED DESCRIPTION OF THE INVENTION

The catalyst composition of this invention comprises a solution of cuprous cyanide and a metal halide or, less preferably, of a cuprous halide and a metal cyanide in a solvent such as tetrahydrofuran — the concentration of copper in the solution being from about 0.1 molar to about 7 molar. Preferably the molarity of the solution is about 0.5 to 2 molar. The metal halide or cyanide may be of lithium or magnesium. The halides may be bromide, chloride, or iodide. Preferably the metal halide is lithium chloride.

The catalyst composition is prepared by the addition of copper (I) cyanide and the metal halide to a solvent such as tetrahydrofuran in a molar ratio of copper (I) cyanide to metal halide of from about 0.5:1 to 3:1. Where the metal halide is a lithium halide and the solvent is tetrahydrofuran, the preferred molar ratio of copper (I) cyanide to metal halide is from about 1:1 to about 2:1. The addition can be carried out at from o° to the boiling point of the solvent depending upon the solubility of the reactants. Suitable solvents include any solvent which does not react rapidly with Grignard reagents and in which the resulting copper (I) cyanide-metal halide complex is soluble including tetrahydrofuran, tetrahydropyran, diethyl ether, and hexamethylphosphoric triamide. The preferred solvent is tetrahydrofuran. The addition procedure should be carried out in an inert atmosphere of e.g. nitrogen, argon, or helium, preferably of nitrogen.

Alternatively, the catalyst composition may be prepared by the addition of the copper (I) halide and the metal cyanide to a solvent such as tetrahydrofuran in a molar ratio of copper (I) halide to metal cyanide of about 1:1. The addition procedure is carried out in an inert atmosphere and is most conveniently performed at room temperature.

The catalyst composition is useful for the alkylation of a Grignard reagent by an organic halide or an organic sulfonate ester. The catalyst is especially useful for coupling reactions of the type $RX'' + R'MgX'$ $R-R' + MgX'X''$ wherein each of R and R' is an aliphatic, aromatic cycloaliphatic or heterocyclic hydrocarbon group, optionally substituted with one or more functional groups that do not react with the Grignard reagent, such as ether groups, thioether groups, silyloxy groups, 4,5-dihydro-2-oxazolyl groups and the like, X' is bromo or chloro and X'' is bromo, methanesulfonate, benzenesulfonate or p-toluenesulfonate.

The reactions for the alkylation of a Grignard reagent by an organic halide or an organic sulfonate ester can be carried out using well-known process conditions commonly used in the art with the advantage that when the catalyst composition of this invention is used, the reaction can be carried out at substantially higher temperatures with no or little loss of product as a result of catalyst decomposition.

In carrying out the reaction for the alkylation of a Grignard reagent by an organic halide or an organic sulfonate ester, the process conditions will, of course, depend upon the particular reactants used. In general, the temperature ranges from about −20°C to about +20°C. This reaction termperature can be optimized for each reaction system. For example, for the reaction of oleyl bromide and amylmagneium bromide, the reaction temperature can be from about −10°C to about +5°C.

The reactions are usually conducted at atmospheric pressure, although slightly higher or slightly lower pressure may be used. The reaction is carried out under an inert atmosphere such as nitrogen, argon or helium.

The time for the reaction to proceed to substantial completion varies with the reactants used. The reaction will ordinarily be complete in from one to 6 hours.

The reactants in the reaction for the alkylation of a Grignard reagent by an organic halide or an organic sulfonate ester are ordinarily used in a 1:1 mole ratio, although excesses of up to 2½ times of either reactant may be used without detriment.

The catalyst composition, when used for the alkylation of a Grignard reagent by an organic halide or an organic sulfonate ester is effective when used at from about 0.5 to about 10 mole percent of the reactants. While amounts greater than 10 mole percent of catalyst may be used, no advantage is gained thereby. Ordinarily from 1.5 to 5 mole percent of the catalyst is used.

The catalyst composition of this invention is also useful for reactions in which the intermediate would react with a Grignard reagent but not with an alkyl copper compound, for example, in the reaction of carbon monoxide or a carboxylic acid halide, anhydride or thioester with a Grignard reagent to give a ketone as the desired product.

For reactions of this type, the catalyst composition of this invention is used in at least a 1:1 molar ratio with the reactant(s).

The term "aliphatic hydrocarbon" as used herein refers to a primary or secondary hydrocarbon group of one to twenty-five carbon atoms, optionally containing one or more sites of olefinic or acetylenic unsaturation and, further, optionally substituted by one or more functional groups that are unreactive in a Grignard reaction. Typical groups falling within this definition include methyl, ethyl, isopropyl, butyl, amyl, erucyl, 2-methylheptyl, lauryl, palmityl, stearyl, oleyl, linoleyl, linolenyl, parinaryl vaccenyl, tariryl, erythrogenyl, methylthiomethyl, ethoxybutyl, and the like.

The term "aromatic hydrocarbon" as used herein refers to an aromatic group of up to fourteen carbon atoms, optionally substituted by one or more functional groups that are non-reactive in a Grignard reaction. Typical aromatic hydrocarbon groups include phenyl, tolyl, xylyl, mesityl, naphthyl, ethylphenyl, t-butylphenyl, isopropylphenyl, methythiophenyl, ethylthiophenyl, isopropylthiophenyl, methoxyphenyl, ethoxyphenyl, vinylphenyl, allylphenyl, and the like.

The term "cycloaliphatic" as used herein refers to a cyclic alkyl group containing three to eight carbon atoms and optionally substituted by one or more functional groups that do not react during a reaction for the alkylation of a Grignard reagent by an organic halide or an organic sulfonate ester, e.g. cyclopropyl, cyclopentyl, cyclohexyl, 4-methoxycyclohexyl, 4-ethylthiocyclohexyl, and the like.

The term "heterocyclic," as used herein, refers to a 4, 5 or 6 member saturated or unsaturated ring system containing one to two hetero atoms selected from oxygen, nitrogen, or sulfur such as, pyridino, morpholino, piperidino, thiazolyl, thienyl, and the like.

The following Examples are provided to illustrate the synthesis of novel catalyst composition of the present invention and the use of this catalyst composition in typical reactions. Temperatures are reported in degrees Centigrade.

EXAMPLE 1

To 100 ml. anhydrous tetrahydrofuran, under nitrogen is added, with stirring, 8.96 g. cuprous cyanide and 4.24 g. anhydrous lithium chloride. Insoluble solids are allowed to settle from the pale green solution. The resultant solution of lithium chlorocyanocuprate is used without further treatment in the reaction for which it is a catalyst.

EXAMPLE 2

To 100 ml. of anhydrous tetrahydrofuran is added 2.24 g. cuprous cyanide and 4.76 g. anhydrous mangesium chloride. The mixture is heated to reflux with stirring for one hour under an atmosphere of nitrogen, then is allowed to cool without stirring. The solution is decanted from insoluble solids and used without further treatment in the reaction for which it is a catalyst.

EXAMPLE 3

To 10 ml. of anhydrous tetrahydrofuran is added 4.35 g. of anhydrous lithium bromide and 4.50 g. of cuprous cyanide. The mixture is heated with stirring to reflux for 15 minutes under an atomosphere of nitrogen. The resulting viscous solution is used without further treatment.

EXAMPLE 4

To 10 ml. of anhydrous tetrahydrofuran is added 1.05 g. anhydrous lithium chloride and 6.75 g. cuprous cyanide. The mixture is heated with stirring at 70° for 15 minutes under an atmosphere of nitrogen. The resulting viscous solution is used without further treatment in the reaction for which it is a catalyst.

EXAMPLE 5

A mixture of 8.95 g. of copper (I) cyanide and 2.1 g. of lithium chloride is placed in a stoppered graduated cylinder which is then evacuated and filled with nitrogen. Anhydrous, oxygen-free tetrahydrofuran is added with swirling to give 50 ml. of solution. Insoluble material is allowed to settle and the supernatant solution is used without further treatment in the reaction for which it is a catalyst.

EXAMPLE 6

To a stirred solution of 1.15 moles of amylmagnesium bromide in 335 ml. anhydrous tetrahydrofuran at −8° is added 0.028 moles of lithium chlorocyanocuprate in tetrahydrofuran, prepared in Example 1 above. Dropwise addition of 1.00 moles of Z-9-octadecenyl bromide is carried out with cooling to maintain the temperature at from about −6° to +5°. The reaction mixture is maintained at −5° to +5° for 1 hour. Magnesium bromide is precipitated by the addition of hexane and a minor amount of water. The slurry of granular solid is filtered and washed with hexane. Evaporation of solvent from the filtrate gives a clear amber oil of Z-9-tricosene in 99% yield.

In contrast, the reaction of one equivalent of oleyl bromide with 1.2 equivalents of amyl-magnesium bromide and 5% m/m lithium dichlorocuprate in tetrahydrofuran at −25° to −15° and using a procedure identical to that of Example 7 gave about 80% conversion to crude Z-9-tricosene. The remainder of the product is Z-1,9-octadecadiene.

The products resulting from this reaction indicate that the catalyst decomposes at the reaction temperature, i.e., −25° to −15°, yielding zero-valent copper which acts as a catalyst for various competing reactions, such as reductive elimination, to yield undesirable products.

Using the procedure and catalyst of Example 7 and erricyl bromide and methylmagnesium bromide as reactants, Z-9-tricosene is obtained in good yield.

I claim as my invention:

1. A catalyst composition consisting essentially of a solution of a compound of the formula $MX(CuCN)_n$ wherein M is lithium or magnesium, X is chloro, bromo, or iodo and n is one, two or three, in a solvent therefor.

2. A composition according to claim 1 wherein M is lithium.

3. A composition according to claim 2 wherein X is chloro, n is one, and the solvent is tetrahydrofuran.

* * * * *